US012761309B2

(12) United States Patent
Finlay et al.

(10) Patent No.: US 12,761,309 B2
(45) **Date of Patent: *Oct. 13, 2026**

(54) PERSONNEL SAFETY SENSING SYSTEM

(71) Applicant: Salunda Limited, Bicester (GB)

(72) Inventors: Alan Patrick John Finlay, Hereford and Worcester (GB); Andrew Henry John Larkins, Berkshire (GB)

(73) Assignee: Salunda Limited, Bicester (GB)

(*) Notice: Subject to any disclaimer, the term of this patent is extended or adjusted under 35 U.S.C. 154(b) by 0 days.

This patent is subject to a terminal disclaimer.

(21) Appl. No.: 18/157,039

(22) Filed: Jan. 19, 2023

(65) Prior Publication Data

US 2023/0152416 A1 May 18, 2023

Related U.S. Application Data

(63) Continuation of application No. 17/387,540, filed on Jul. 28, 2021, now Pat. No. 12,320,909, which is a (Continued)

(30) Foreign Application Priority Data

Mar. 29, 2018 (GB) ...................................... 1805323
Apr. 17, 2018 (GB) ...................................... 1806281
(Continued)

(51) Int. Cl.
*G01S 5/02* (2010.01)
*G01S 17/48* (2006.01)
(Continued)

(52) U.S. Cl.
CPC .......... *G01S 5/02585* (2020.05); *G01S 17/48* (2013.01); *G01S 17/88* (2013.01); *G08B 21/02* (2013.01); *H04B 1/385* (2013.01); *G08B 7/06* (2013.01)

(58) Field of Classification Search
CPC ...... G01S 5/02585; G01S 17/48; G01S 17/88; G08B 21/02; G08B 7/06; H04B 1/385
(Continued)

(56) References Cited

U.S. PATENT DOCUMENTS 6,054,950 A 4/2000 Fontana
6,108,636 A * 8/2000 Yap ........................ G06Q 10/00 705/5
(Continued)

FOREIGN PATENT DOCUMENTS

CA 3 052 961 A1 8/2018
GB 2491518 A 12/2012
(Continued)

OTHER PUBLICATIONS

Anonymous: "Welcome to AC500-S Safety PLC Engineering Functional Safety", Mar. 1, 2013 (Mar. 1, 2013), XP093051035 (Year: 2014).*
(Continued)

*Primary Examiner* — Nuzhat Pervin
(74) *Attorney, Agent, or Firm* — HONIGMAN LLP; Eric J. Sosenko; Jonathan P. O'Brien

(57) ABSTRACT

A location system for locating workers including a plurality of light detectors mounted at known locations and configured to detect light from one or more workers, and a processing system configured to determine locations of the workers using the light detected by the light detectors. There is also disclosed a wearable device for locating a worker including a wireless transceiver, and a wearable device light source and/or one or more reflective elements. There is also disclosed a method for locating workers including detecting light from one or more workers using a plurality of light
(Continued)

detectors mounted at known locations, and determining locations of the workers using the light detected by the light detectors.

17 Claims, 3 Drawing Sheets

Related U.S. Application Data continuation of application No. 16/659,366, filed on Oct. 21, 2019, now Pat. No. 11,079,464, which is a continuation of application No. PCT/GB2019/050932, filed on Mar. 29, 2019.

(30) Foreign Application Priority Data

Apr. 24, 2018 (GB) .................................... 1806697
Aug. 28, 2018 (GB) .................................... 1813975
Oct. 26, 2018 (GB) .................................... 1817474
Mar. 18, 2019 (GB) .................................... 1903656

(51) Int. Cl.
*G01S 17/88* (2006.01)
*G08B 7/06* (2006.01)
*G08B 21/02* (2006.01)
*H04B 1/3827* (2015.01)

(58) Field of Classification Search
USPC .......................................................... 342/451
See application file for complete search history.

(56) References Cited

U.S. PATENT DOCUMENTS 6,782,264 B2 * 8/2004 Anderson ................ G01S 5/06 455/560
6,876,326 B2 4/2005 Martorana
7,089,019 B2 * 8/2006 Ormson ................ G01S 5/0063 342/450
7,132,981 B1 11/2006 Roberts
7,606,496 B1 * 10/2009 Mitchell ............ H04B 10/1121 398/125
7,802,724 B1 * 9/2010 Nohr ........................ G07C 9/28 235/384
7,868,760 B2 1/2011 Smith et al.
8,618,931 B2 * 12/2013 Rossmann ........... G08B 25/016 455/404.2
9,107,043 B2 * 8/2015 Gupta ................. H04W 64/003
9,125,381 B2 9/2015 Gurley et al.
9,322,654 B2 4/2016 Böckem
9,396,398 B2 7/2016 Kozicz et al.
9,398,412 B2 7/2016 Prechner et al.
9,623,558 B1 4/2017 Stubbs et al.
9,672,713 B2 6/2017 Beggs et al.
9,836,941 B2 12/2017 Mendiola et al.
9,955,559 B2 * 4/2018 Engelen ............... G05D 1/0022
10,024,952 B2 7/2018 Want et al.
10,139,282 B2 * 11/2018 Chrostowski ........ A61B 5/0017
10,176,349 B1 1/2019 Mountz
10,185,034 B2 * 1/2019 Smith .................... G01C 21/26
10,235,857 B2 3/2019 Jones
10,264,982 B2 * 4/2019 Ahmed ................. A61B 5/1112
10,402,662 B2 9/2019 Kozicz et al.
10,488,550 B2 * 11/2019 Albert .................. G01S 7/4817
10,597,053 B2 3/2020 Mian et al.
10,885,758 B2 1/2021 Johnson et al.
11,079,464 B2 * 8/2021 Finlay ..................... G01S 17/88
11,157,710 B2 10/2021 Sundia et al.
11,163,034 B2 11/2021 Olsen et al.
11,238,717 B2 2/2022 Johnson et al.
11,263,568 B2 3/2022 Kanukurthy et al.
11,480,044 B2 10/2022 Menard et al.
11,854,366 B1 12/2023 Thoma et al.
2002/0122003 A1 9/2002 Patwari et al.
2002/0172223 A1 * 11/2002 Stilp .................... H04W 64/00 370/480
2003/0017832 A1 * 1/2003 Anderson ................. G01S 5/06 342/357.29
2003/0179140 A1 9/2003 Patterson et al.
2006/0271263 A1 * 11/2006 Self ...................... G05B 19/409 701/2
2007/0017682 A1 1/2007 Abrahamsen et al.
2007/0073473 A1 * 3/2007 Altan .................... G01S 13/862 701/518
2007/0236677 A1 * 10/2007 VanVoorst ............... G01C 3/18 356/3.1
2008/0004904 A1 * 1/2008 Tran ..................... A61B 5/0006 340/286.07
2008/0030359 A1 2/2008 Smith et al.
2008/0169927 A1 * 7/2008 Graves .................. G06Q 10/10 340/572.1
2010/0279707 A1 11/2010 Fischer et al.
2010/0289662 A1 11/2010 Dasilva et al.
2011/0153349 A1 * 6/2011 Anderson ............. G06Q 10/06 705/2
2011/0170862 A1 * 7/2011 Smith ................ H04J 14/0227 398/26
2011/0229145 A1 * 9/2011 Smith ................ H04B 10/2935 398/136
2011/0298579 A1 12/2011 Hardegger et al.
2012/0015670 A1 * 1/2012 Boyer ..................... G01S 19/46 455/456.1
2012/0026041 A1 2/2012 Murdock et al.
2012/0062725 A1 * 3/2012 Wampler ................ G01V 8/12 348/86
2012/0098653 A1 4/2012 Slack
2013/0038856 A1 * 2/2013 Williams ................ G01S 17/87 356/3.12
2013/0120192 A1 * 5/2013 Larson .................. G01S 5/0249 342/386
2013/0217417 A1 8/2013 Mohideen et al.
2013/0294266 A1 11/2013 Lim et al.
2014/0274115 A1 9/2014 Michalson et al.
2015/0144684 A1 5/2015 Leung
2015/0153160 A1 * 6/2015 James .................. G01C 21/206 356/614
2015/0158428 A1 6/2015 Beggs et al.
2015/0161872 A1 * 6/2015 Beaulieu ................. B66C 13/40 340/686.6
2015/0254986 A1 * 9/2015 Fairfield ............... B60W 30/00 707/687
2016/0019737 A1 * 1/2016 Stagg ....................... G07C 9/28 340/5.61
2016/0025846 A1 * 1/2016 Mostov ................. G01S 13/886 342/28
2016/0097837 A1 * 4/2016 Richley ................. G01S 5/0244 342/465
2016/0179062 A1 * 6/2016 Marchione ............. G07C 5/008 700/85
2016/0227634 A1 * 8/2016 Engelen ............... G05D 1/0022
2016/0231426 A1 * 8/2016 Smith .................... G01C 21/26
2016/0259028 A1 * 9/2016 High ....................... A47F 10/04
2016/0282448 A1 9/2016 Sen et al.
2016/0292513 A1 10/2016 Kozicz et al.
2016/0318438 A1 * 11/2016 Wadell ................. B60Q 1/0094
2016/0363659 A1 12/2016 Mindell et al.
2017/0068924 A1 3/2017 Tanaka et al.
2017/0085293 A1 3/2017 Marrow et al.
2017/0132884 A1 5/2017 Kumar et al.
2017/0221334 A1 8/2017 Zhang et al.
2017/0257717 A1 * 9/2017 Milevski ............. H04R 29/001
2017/0270761 A1 * 9/2017 Jones .................... H04W 84/00
2017/0314369 A1 11/2017 Rosano et al.
2017/0351923 A1 * 12/2017 Rice, II .................. G06V 20/52
2018/0197052 A1 * 7/2018 Yanson ............ G06K 19/06037
2018/0248623 A1 * 8/2018 Ryan ..................... G01S 1/0426
2018/0269715 A1 * 9/2018 Hannigan ............... H02J 50/10
2018/0323657 A1 * 11/2018 Hannigan ............... H02J 50/23
2018/0364693 A1 12/2018 Harshbarger

(56) References Cited

U.S. PATENT DOCUMENTS

| | | | | |
|---|---|---|---|---|
| 2019/0043064 | A1* | 2/2019 | Chin | G06Q 30/0201 |
| 2019/0101377 | A1* | 4/2019 | White | G01B 11/14 |
| 2019/0141470 | A1* | 5/2019 | Hallett | G01S 5/014 |
| 2019/0175411 | A1* | 6/2019 | Awiszus | A62B 9/006 |
| 2019/0175961 | A1* | 6/2019 | Awiszus | A61F 9/067 |
| 2019/0195981 | A1 | 6/2019 | Ding et al. | |
| 2019/0302719 | A1 | 10/2019 | Aljuaid | |
| 2019/0385583 | A1* | 12/2019 | Muggleton | G10K 11/17881 |
| 2020/0064433 | A1 | 2/2020 | Finlay et al. | |
| 2020/0099893 | A1 | 3/2020 | Pratt et al. | |
| 2022/0355482 | A1* | 11/2022 | Denenberg | B25J 9/1666 |
| 2022/0391867 | A1* | 12/2022 | Glaser | G06F 3/017 |

FOREIGN PATENT DOCUMENTS

| | | | | | |
|---|---|---|---|---|---|
| JP | 5097045 | B2 | | 12/2012 | |
| KR | 20110019196 | A | | 2/2011 | |
| KR | 102389633 | B1 | * | 4/2022 | G06V 40/103 |
| WO | WO-2008080226 | A1 | * | 7/2008 | G01S 19/06 |
| WO | WO-2011136816 | A1 | * | 11/2011 | G01S 17/87 |
| WO | 2015041687 | A1 | | 3/2015 | |
| WO | 2015144684 | A1 | | 10/2015 | |
| WO | 2016011507 | A1 | | 1/2016 | |
| WO | 2016124949 | A1 | | 8/2016 | |
| WO | 2017152213 | A1 | | 9/2017 | |
| WO | 2017223008 | A1 | | 12/2017 | |
| WO | WO-2017223451 | A1 | * | 12/2017 | H04Q 9/00 |
| WO | WO-2018019553 | A1 | * | 2/2018 | H05B 47/155 |
| WO | WO-2019084314 | A1 | * | 5/2019 | G06V 40/10 |
| WO | 2019186202 | A1 | | 10/2019 | |
| WO | 2020044014 | A1 | | 3/2020 | |
| WO | 2020060938 | A1 | | 3/2020 | |

OTHER PUBLICATIONS

Teizer et al., "Ultrawideband for Automated Real-Time Three-Dimensional Location Sensing for Workforce, Equipment, and Material Positioning and Tracking", Transportation Research Record, 2081 (1 ), 56-64, 2008.

International Search Report for International Application No. PCT/GB2019/052263, dated Dec. 11, 2019.

Examination Report issued to application No. EP 19 753 469.6, dated Mar. 28, 2022.

Monica et al., "Low-complexity UWB-based collision avoidance system for automated guided vehicles", ICT Express, vol. 2, Issue 2, 2016, pp. 53-56, ISSN 2405-9595.

Mucchi et al., "Experimental measurements of the accuracy of commercial UWB real-time localisation systems and proposal of new collision avoidance algorithms for industrial applications", Int. J. Ultra Wideband Communications and Systems, vol. 2, No. 4, 2012.

Andolfo et al., "Real-time accident detection using UWB tracking", 5th International/11th International Construction Specialty Conference (2015, Vancouver, B.C.); Canadian Society for Civil Engineering.

Australian Patent Application No. 2019331693, Examination Report, dated Mar. 21, 2024.

Final Office Action, U.S. Appl. No. 17/270,108, mailed Apr. 18, 2024.

Non-final Office Action, U.S. Appl. No. 17/270,108, mailed Sep. 28, 2023.

Technical Examination Report, Brazil Patent Application No. BR122024005879-0, dated Dec. 4, 2024.

Final Office Action, U.S. Appl. No. 16/659,366, mailed Dec. 21, 2020.

Non-Final Office Action issued in U.S. Appl. No. 17/984,686, dated Feb. 26, 2025.

Non-Final Office Action issued in U.S. Appl. No. 17/984,760, dated Jan. 28, 2025.

Non-final Office Action issued in U.S. Appl. No. 17/720,108, dated Jun. 10, 2022.

Final Office Action issued in U.S. Appl. No. 17/270,108, dated May 9, 2023.

Non-Final Office Action issued in U.S. Appl. No. 17/720,108, dated Sep. 10, 2024.

Final Office Action issued in U.S. Appl. No. 17/720,108, dated Nov. 13, 2024.

International Search Report issued in PCT Application No. PCT/GB2019/050932, dated Jun. 24, 2019.

Non-final Office Action issued in U.S. Appl. No. 19/226,444, mailed on Jul. 8, 2025.

Non-Final Office Action, U.S. Appl. No. 17/387,540, mailed Oct. 4, 2022.

Non-final Office Action, U.S. Appl. No. 16/689,366, mailed Jan. 22, 2020.

Anonymous: "Welcome to AC500-S Safety PLC Engineering Functional Safety", Mar. 1, 2013 (Mar. 1, 2013), XP093051035, Retrieved from the Internet: URL:https://library.e.abb.com/public/775c7cfcf5ef4ec9881003ac2964b358/3ADR025011B020 1_2014-11-21.pdf.

* cited by examiner

PERSONNEL SAFETY SENSING SYSTEM

CROSS-REFERENCE TO RELATED APPLICATION

This application is a continuation of U.S. patent application Ser. No. 17/387,540 filed Jul. 28, 2021, which is a continuation of U.S. patent application Ser. No. 16/659,366 filed Oct. 21, 2019, which is a continuation of International Application No. PCT/GB2019/050932, filed Mar. 29, 2019, which claims priority to United Kingdom Application No. 1903656.5, filed Mar. 18, 2019, United Kingdom Application No. 1817474.8, filed Oct. 26, 2018, United Kingdom Application No. 1813975.8, filed Aug. 28, 2018, United Kingdom Application No. 1806697.7, filed Apr. 24, 2018, United Kingdom Application No. 1806281.0, filed Apr. 17, 2018, and United Kingdom Application No. 1805323.1, filed Mar. 29, 2018, the contents of which are incorporated herein by reference.

TECHNICAL FIELD

The invention relates to systems and methods for locating workers and/or machinery, particularly in industrial or hazardous environments. A wearable device for locating workers is also provided.

BACKGROUND

In many situations it is desirable to be able to track the locations of workers and/or machinery in industrial environments, or environments that are potentially hazardous or dangerous for workers. Examples of such environments include oil rigs, in particular the drill floor of an oil rig. This ensures proper action can be taken if a worker may be at risk by entering an unsafe area or moving too close to hazardous machinery.

While such systems are generally known, they can be unreliable in some situations or provide limited coverage of the relevant area. It is therefore desirable to provide improved systems, methods, and devices for locating workers and/or machinery.

SUMMARY

According to a first aspect of the invention, there is provided a location system for locating workers comprising a plurality of light detectors mounted at known locations and configured to detect light from one or more workers, and a processing system configured to determine locations of the workers using the light detected by the light detectors.

In an embodiment, the processing system is further configured to determine if the location of one or more of the workers is within a defined area and output a warning signal in response thereto. This allows the worker or supervising personnel to take action to avoid a hazard.

In an embodiment, the processing system is further configured to control the activity of machinery based on the determined location of one or more of the workers. This means machinery can be automatically controlled to reduce the chance of accidents, so that the risk to workers is further reduced.

In an embodiment, the processing system is configured to determine the locations of the workers using the light detected by the light detectors by triangulation of light. This is a robust technique for locating objects, and so constitutes a reliable choice of location method.

In an embodiment, the light from the workers is light reflected from the workers. This is means that light from light sources around the area, or even ambient light, can be used to locate the worker, simplifying the location system.

In an embodiment, the system further comprises illuminating light sources adjacent to respective light detectors, the light reflected from the workers being light from the illuminating light source. Using illuminating light sources ensures that there is sufficient light to identify the position of workers even when ambient light is low, or workers do not carry their own light sources.

In an embodiment, the illuminating light source outputs modulated light. This provides a system which allows more robust detection of workers, as the modulated light can be distinguished easily in the field of view of the cameras from unmodulated light.

In an embodiment, the illuminating light source is modulated in intensity over time. Intensity modulation is straightforward to implement on the light source, and so provides a convenient type of modulation.

In an embodiment, the light detectors are phase-locked to the illuminating light source. This further increases the ability of the location system to differentiate light from the workers from light from other sources and improve the ability to robustly detect their locations.

In an embodiment, the system further comprises at least one reflective element to be mounted on respective workers, the light reflected from the workers being light reflected from the reflective element. This increases the light reflected from the workers and makes them easier to identify.

In an embodiment, the at least one reflective element is incorporated into items of personal protective equipment to be worn by respective workers. This simplifies the provision of reflective elements by using equipment already commonly worn by workers.

In an embodiment, the system may further comprise a wearable device to be worn by respective workers, the at least one reflective element mounted on the wearable device. Providing a wearable device to each worker is an alternative way to ensure each worker carries an appropriate reflective element, for example if their PPE does not already contain reflective elements.

In an embodiment, the at least one reflective element comprises a retroreflector. These are particularly effective at reflective light, making the workers easier to detect.

In an embodiment, the light reflected from the reflective element is modulated light. This has similar advantages as for the illuminating light source above.

In an embodiment, the modulated light is spatially modulated in intensity. Spatial modulation is advantageous by being straightforward to provide on the reflective elements, for example by having stripes of differential reflectivity.

In an embodiment, the modulated light encodes a unique identifier. This allows workers to be identified, and distinguished from other workers or machines.

In an embodiment, the system further comprises wearable devices to be worn by respective workers, wherein the wearable devices each comprise a wearable device light source, the light from the workers being light from the wearable device light source. This increases the likelihood of workers being visible compared to simple reflection, where they may be sheltered from the illuminating light source.

In an embodiment, the wearable device light source outputs modulated light. In an embodiment, the modulated light is modulated in intensity over time. In an embodiment, the light detectors are phase-locked to the light source.

These embodiments have similar advantages as described above for the illuminating light source.

In an embodiment, the modulated light encodes a unique identifier. This has a similar advantage as described for the reflective elements above.

In an embodiment, the system further comprises wearable devices to be worn by one or more of the workers who are authorized, the wearable device including a wireless transceiver, and a plurality of wireless receivers mounted at known locations and configured to detect wireless signal transmissions from the wearable device, the processing system being configured to determine locations of the authorized workers using the wireless signal transmissions from the wearable device detected by the wireless receivers. Using wireless location finding in addition to optical location finding can improve the robustness of location finding using the system.

A device is disclosed for monitoring of workers operating in dangerous environments and alongside robotic machinery and automated equipment. The device tracks motion and location of a worker and may be integrated into personal protective equipment or worn on limbs. The device of the invention may be worn in a hazardous working environment such as a drill floor, deck or on a rig for drilling and extracting hydrocarbons.

In an embodiment, the wireless signal transmissions comprise radio-frequency signal transmissions. This is a common and well-understood type of signal transmission, making the design and procurement of suitable equipment straightforward.

In an embodiment the processing system is configured to determine the locations of the authorized workers using ultrawideband radio-frequency location. This has the advantage of being less affected by other objects in the area which may otherwise impede the detection of wireless signals.

In an embodiment, the processing system is configured to determine the locations of the authorized workers using the wireless signal transmissions from the wearable device by triangulation of the wireless signal transmissions. This has similar advantages as described above for optical triangulation.

In an embodiment, the processing system is configured to determine locations of the authorized workers by combining the locations of the authorized workers determined using the light detected by the light detectors and the locations of the authorized workers determined using the wireless signal transmissions from the wearable device. This providing an alternative or additional source of location information to improve accuracy and/or reliability of the location information.

In an embodiment, the processing system is further configured to identify as unauthorized workers any workers whose location is determined using the light detected by the light detectors who are not authorized workers whose location is determined using the wireless signal transmissions from the wearable device. Only authorized workers are provided with a wearable device comprising a wireless transceiver. This provides a way to distinguish between unauthorized workers, who will still be visible to the optical location detection, and authorized workers, who will be visible by both optical and wireless means.

In an embodiment, the processing system is configured to output a warning signal if the location of one or more of the workers identified as unauthorized workers is within a defined area. Unauthorized workers may have different training or safety clearance to authorized workers, so different safety precautions may be needed for authorized and unauthorized workers.

In an embodiment, the processing system is further configured to control the activity of machinery based on the location of the workers identified as unauthorized workers. This allows the risk to unauthorized workers, who may not have appropriate training or clearance to handle particular machinery, to be reduced.

In an embodiment, the processing system is further configured to determine locations of machinery using light from the machinery detected by the light detectors. Detecting machines in addition to workers can be particularly important where machinery is moving, so that risk to workers may be further reduced as they may be unaware of the current position of a machine.

In an embodiment, the light from the machinery is light reflected from the machinery. This is means that light from light sources around the area, or even ambient light, can be used to locate the machinery, simplifying the location system.

In an embodiment, the system further comprises at least one reflective element to be mounted on the machinery, the light reflected from the machinery being light reflected from the reflective element. This increases the light reflected from the machinery and makes it easier to identify.

In an embodiment, the at least one reflective element comprises a retroreflector. These are particularly effective at reflective light, making the machines easier to detect.

In an embodiment, the light reflected from the reflective element is modulated light. This provides a system which allows more robust detection of workers, as the modulated light can be distinguished in the field of view of the cameras from unmodulated light.

In an embodiment, the modulated light is spatially modulated. Spatial modulation is advantageous by being straightforward to provide on the reflective elements, for example by having stripes of differential reflectivity.

In an embodiment, the modulated light encodes a unique identifier. This allows workers to be identified, and distinguished from other machines or workers.

In an embodiment, the location system further comprises mountable devices to be mounted on respective machinery, wherein the mountable devices each comprise a mountable device light source, the light from the machinery being light from the mountable device light source. This increases the likelihood of machinery being visible compared to simple reflection, where it may be sheltered from the illuminating light source.

In an embodiment, the location system further comprises mountable devices to be mounted on machinery which is authorized, the mountable device including a wireless transceiver, and a plurality of wireless receivers mounted at known locations and configured to detect wireless signal transmissions from the mountable device, the processing system being configured to determine locations of the authorized machinery using the wireless signal transmissions from the mountable device detected by the wireless receivers. Using wireless location finding in addition to optical location finding can improve the robustness of location finding using the system.

In an embodiment, the processing system is further configured to identify as unauthorized machinery any machinery whose location is determined using the light detected by the light detectors which is not authorized machinery whose location is determined using the wireless signal transmissions from the mountable device. Only authorized machinery is provided with a mountable device comprising a wireless transceiver. This provides a way to distinguish between unauthorized machinery, which will still be visible to the optical location detection, and authorized machinery, which will be visible by both optical and wireless means.

In an embodiment, the processing system is further configured to compare the determined locations of workers to the determined locations of machinery. This allows for monitoring of safe areas around machinery.

In an embodiment, the processing system is further configured to output a warning signal and/or control the activity of machinery based on the comparison of the locations of workers and the locations of machinery. This allow automatic action to be taken if a worker moves too close to a potentially dangerous piece of machinery.

According to a second aspect of the invention, there is provided a wearable device for locating a worker comprising a wireless transceiver, a wearable device light source and/or one or more reflective elements. This device may be used in the location system and given to workers as described above. Similar devices may equally be mounted on machinery.

In an embodiment, the wearable device comprises a wearable device light source, and the wearable device light source outputs modulated light. This increases the likelihood of workers being visible compared to simple reflection, where they may be sheltered from the illuminating light source. The modulated light can be distinguished easily in the field of view of the cameras from unmodulated light.

In an embodiment, the wearable device light source is modulated in intensity over time. Intensity modulation is straightforward to implement on the light source, and so provides a convenient type of modulation.

In an embodiment, the modulated light encodes a unique identifier. This allows workers to be identified, and distinguished from other workers or machines.

In an embodiment, the wearable or machine mountable device comprises a reflective element and light reflected from the reflective element is modulated light, optionally wherein the modulated light is spatially modulated in intensity. This has similar advantages as described above for the mountable device light source. Spatial modulation is advantageous by being straightforward to provide on the reflective elements, for example by having stripes of differential reflectivity.

In an embodiment, the wearable device further comprises a power supply. The power supply allows the wearable device to operate wirelessly and be fully portable.

In an embodiment, the wearable device further comprises an accelerometer and/or a gyroscope. Additional sensors in the wearable device can provide additional useful information for locating workers and machinery. Accelerometers can inform whether a worker or piece of machinery is currently moving. A gyroscope allows the orientation of the device to be determined as well.

According to a third aspect of the invention, there is provided a method for locating workers comprising detecting light from one or more workers using a plurality of light detectors mounted at known locations, and determining locations of the workers using the light detected by the light detectors.

Embodiments of the method can comprise method steps and features equivalent to the features of embodiments of the location system and wearable device as described above.

BRIEF DESCRIPTION OF THE DRAWINGS

Embodiments of the present invention will now be described by way of non-limitative example with reference to the accompanying drawings, in which.

DETAILED DESCRIPTION

Figure 1:
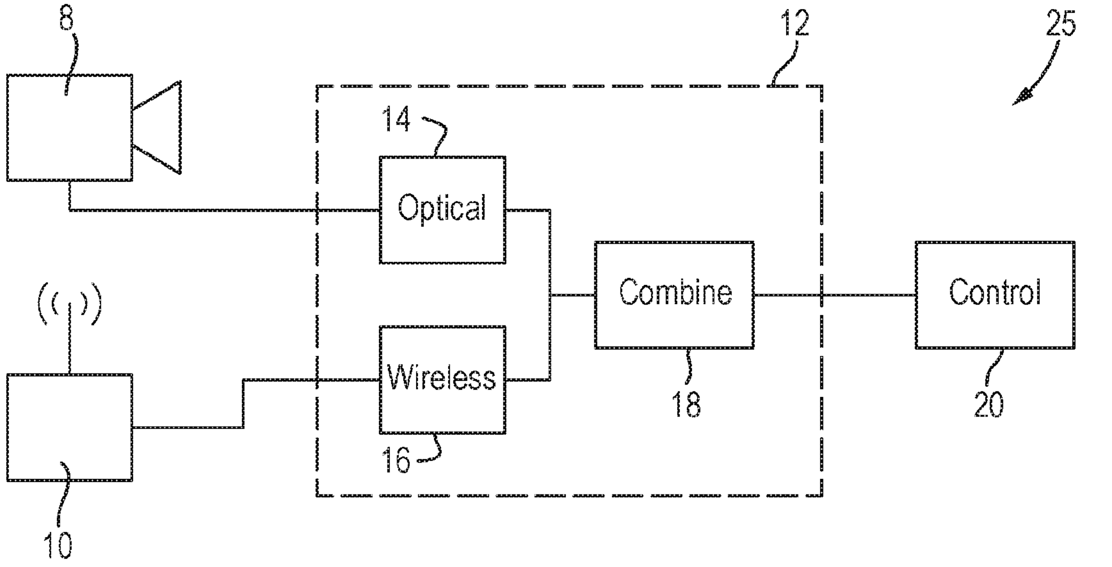
FIG. 1 is a schematic of a location system according to an embodiment.

FIG. 1 shows a schematic of a location system 25 for locating workers 2 comprising a plurality of light detectors 8 mounted at known locations and configured to detect light from one or more workers 2. Cameras mounted around a hazardous area or zone of operations may be used to synchronously identify personnel, or machinery, by detecting light reflected by retroreflective surfaces, strips or materials or devices mounted on personal protective equipment (PPE) and/or machinery. As well as cameras, other light detectors 8 may be used and selected as appropriate, for example photodiodes. When coupled with a global shutter camera a very high signal to noise may be achieved. This can be beneficial for detecting light from the worker 2 in cluttered or obscured environments.

In some embodiments the location system 25 further comprises a wearable device 6 with a light source. More than one camera mounted at a known location and detecting the light source of the device, or a 360 camera, or some combination of cameras may be used to triangulate the exact location of the device from more than one camera using known camera location and angle. A similar approach can be used when the wearable device 6 does not include a light source 38, or even when no wearable device 6 is provided, as will be described further below.

The location system 25 further comprises a processing system 12 configured to determine locations of the workers 2 using the light detected by the light detectors 8. The processing system 12 may comprise one or more processing units. Each processing unit may be provided in the same location or piece of equipment as other processing units, or may be provided separately. In an embodiment, the processing system 12 is configured to determine the locations of the workers 2 using the light detected by the light detectors 8 by triangulation of light. This determining is carried out by an optical processing unit 14. Where a wearable device 6 is provided, measurement of the angle of incident emitted light at each camera can be used to calculate the location of the person-worn device 6, and therefore the worker 2, rapidly and with a high degree of accuracy and precision. Alternatively, other techniques may be used, such as measuring the time of flight of optical signals between the workers 2 and the light detectors 8, or performing video analytics to identify workers 2 in video images captured by the light detectors 8.

In an embodiment, the location system 25 is also used to locate machinery 3, and the processing system 12 is further configured to determine locations of machinery 3 using light from the machinery 3 detected by the light detectors 8. The same techniques and principles can be applied to determining the locations of machinery 3 as for determining the locations of workers 2.

In an embodiment, the light from the workers 2 used to determine their locations is light reflected from the workers 2. Similarly, in an embodiment where the system is used to locate machinery 3, the light from the machinery 3 is light reflected from the machinery 3. The images collected by the collection system may be processed and compared to eliminate noise and only record reflected light. Any conventional type of image processing may be used to eliminate noise or visual clutter from other light sources and improve the quality of processed images for the purposes of determining location. Examples include thresholding or averaging.

In an embodiment, the location system 25 further comprises illuminating light sources 9 adjacent to respective light detectors 8, the light reflected from the workers 2 or machinery 3 being light from the illuminating light source 9. This allows greater control over the light in the environment, making sure there is sufficient illumination to detect workers 2 and machinery 3. It also allows properties of the light to be controlled. Contrast can be improved further by putting a narrow band optical filter in front of the camera 8. This stops most of the sun light but allow your light source 9 through. Suitable light sources include LEDs, low-power lasers, including laser diodes, or even conventional light sources such as halogen or incandescent lamps. The illuminating light source 9 may use a wavelength of light invisible to the human eye in order to avoid causing distraction.

In an embodiment, the illuminating light source 9 outputs modulated light. The modulation is in general of any property of the light, including its intensity and wavelength. These properties may be modulated in time and/or space. In an embodiment, the illuminating light source 9 is modulated in intensity over time.

The modulation can be achieved by controlling the output of the illuminating light source 9 directly, or by applying a filter to the output of the illuminating light source 9, for example an LED shutter.

The modulated light source 9 may use a wavelength that is invisible to the human eye, such as near infra-red (NIR), mounted as a cluster of NIR LEDs around a camera, and that modulate at a frequency that is synchronized with the frequency of detection of the camera 8, and that is reflected by the retroreflectors 4 mounted or incorporated onto the PPE worn by the person 2 on the drill floor or around the rig. The location, in combination with time, can be used to determine the velocity and acceleration of the device 6, and similarly the modulation of the light source can be used to transmit information such as velocity, acceleration, angle and identify.

In an embodiment where the illuminating light source 9 is modulated in time, the light detectors 8 are phase-locked to the illuminating light source 9. The light may be flashing, and the camera or detector 8 may be synchronized with the flashing light to improve signal to noise ratios. The modulation of the light makes it easier for the location system 25 to distinguish between light from the illuminating light source 9 and light from other sources. The phase of the light may be locked to the phase of the camera 8 to exclude extraneous sources of light, such as background light, overhead lighting, lamps, reflections or direct sun light. The camera 8 is connected to a computer or processor and detects the person 2 or machine 3 by synchronously imaging illuminating and reflected light and comparing images recorded with and without illumination. If you have multiple lights sources you can modulate them at different rates. In the type of system of the invention this is less of an issue, because they are likely to be spatially separate, but may be useful when devices or people are co-located.

In an embodiment, the location system 25 further comprises at least one reflective element 4 to be mounted on respective workers 2 or machinery 3, the light reflected from the workers 2 or machinery being light reflected from the reflective element 4. The at least one reflective element 4 may comprise a retroreflector. Retroreflectors are particularly effective at reflecting light, and make it easier to discern the workers 2 or machinery 3 and determine their position. This is also advantageous in an embodiment where illuminating light sources 9 are located adjacent to respective light detectors 8. A retroreflector bounces light back in the direction it came from. Therefore, they reflect a large proportion of the incident light back towards the light detectors 8. This can provide a superior signal to noise than a simple, or modulating, light source on the device 6 of the invention since only a light source very close to the camera provides a very bright reflection whereas the same light source at some distance away may be a signal hundreds, or thousands, of times weaker.

Likewise, it may be added to equipment and other objects around the rig floor or deck. Therefore, in an embodiment, the location system 25 further comprises at least one reflective element 4 to be mounted on the machinery 3, the light reflected from the machinery 3 being light reflected from the reflective element 4. The at least one reflective element 4 may comprise a retroreflector.

The retroreflector system often reflects a modulated light source and dramatically helps improve contrast in the presence of strong light or poor contrast. The retroreflector would be selected to have an aspect ratio, or surface area, to ensure that although it may be partially obscured by dirt or other objects, the remainder of the retroreflector is visible to the camera or other suitable detector synchronized to modulated or flashing light source triggering the retroreflector. Likewise, multiple retroreflective strips or devices may be added to the person worn location device 6 and/or to the equipment 3 of interest.

The light from the light source or retroreflector may be coupled with a detector or camera and their phases locked so that you take one image with the light on and one with the light off. In this manner, the difference in intensity between the two images from the retroreflector with the source light on and off (reflected and reflected respectively) will be very substantial. This helps makes light reflected from a retroflector visible even in direct sunlight.

Alternatively, rather than a modulated light source such as a flashing LED, a retroreflector mounted on the device or person or PPE may be used (as simple as a reflecting strip that is common on PPE suits and workwear). Therefore, in an embodiment, the at least one reflective element is 4 incorporated into items of personal protective equipment (PPE) 11, 13 to be worn by respective workers. Since such PPE is typically worn by workers 2 in an industrial or hazardous environment already, using reflective elements on PPE is a particularly convenient way to provide workers 2 with compatible reflective elements.

Personal protective equipment includes boots, gloves, hard hats and overalls and may commonly incorporate reflecting strips. These strips may be retroreflective, or it not, may be upgraded, replaced or complimented with retroreflective surfaces or devices or strips on all PPE including boots, hats, gloves and overalls. The retroflecting device or material or surface may be incorporated into PPE as a removal device, or sewn into materials, or as epaulettes etc.

The retroreflector may be mounted on the most common item of PPE such as a hard-hat, gloves or boots, or all three. This retroreflector may be a spot, or strip, stitching, or strand of material or some combination of the above or surfaces and shapes that may be incorporated into the PPE such that it is permanently attached and may be visible from all angles.

The system of the invention includes flashing sources of light, cameras 8 or other suitable array detectors, and retroreflective surfaces 4 or devices or strips mounted or incorporated into all PPE such that, even if one piece of PPE is missing, another piece of PPE will be detected by the location system 25 of the invention.

As mentioned above, in some embodiments, the location system 25 further comprises a wearable device 6 to be worn by respective workers 2, the at least one reflective element 4 mounted on the wearable device 6. Finally, it is possible to modulate the retroreflector 4. In an embodiment, the light reflected from the reflective element 4 is modulated light. As for the illuminating light source 9 described above, any suitable type of modulation can be used. You can have white light retroreflectors which reflect all wavelengths of visible, and near IR. You can also use colored retroreflectors. In an embodiment, the modulated light is spatially modulated in intensity.

For example, by putting an LED shutter in front of it. This can be used to confirm the identity of a specific retro reflector, as described further below. Therefore it is possible to modulate the reflected light in both space and time. The retroflector may be triggered by a light, or an array of lights, co-located or in the vicinity of the camera 8.

There are many variants on this technique. Some, depend on filtering by wavelength or frequency and others depend on phase coding and coherent optical detection, or even modulating a retroreflector 4 or making it wavelength specific. The retroreflective material may be wavelength specific such that it corresponds to the light emitted by the detection location system 25 and reflects only when illuminated and back in the direction of illumination.

Additionally, the retroreflector may be encoded (e.g. reflect a particular wavelength, or omit a particular wavelength, or filter the received light to emit at a particular frequency or the strip may include filtering to adsorb certain wavelengths and emit others) to identify a particular individual, piece of equipment or object when triggered by the modulated light source. Therefore, in an embodiment, the modulated light encodes a unique identifier. This may apply to modulated light reflected from reflective elements on workers 2 or machinery 3. As discussed above, the modulation may be spatial modulation, for example of intensity. This could be provided by, for example, a barcode or QR code placed on the workers 2 or machinery 3. In embodiments where the location system 25 outputs alarms or controls machinery, as will be described further below, this may be useful if different personnel have different training or permissions, or different machinery requires different safety precautions.

In an embodiment, the location system 25 further comprises wearable devices 6 to be worn by respective workers 2, wherein the wearable devices 6 each comprise a wearable device light source 38, the light from the workers being light from the wearable device light source 38. The light source may be detected using at least one camera 8, or photodetector, and messages received by means of detecting and monitoring modulation of the at least one light source 38.

Similar devices may also be mounted on machinery 3 to locate the machinery 3. In an embodiment, the system further comprises mountable devices 7 to be mounted on respective machinery 3, wherein the mountable devices 7 each comprise a mountable device light source, the light from the machinery 3 being light from the mountable device light source. The mountable devices 7 for machinery 3 are substantially the same as wearable devices 6 provided for workers 2, although some differences may exist. For example, wearable devices 6 may be smaller than mountable devices 7 to allow them to be more easily carried by workers 2.

The wearable device light source 38 or mountable device light source can be any suitable light source such as an LED. The use of a light source such as a LED can overcome limitations of camera technology such as strong background lighting, glare, low or poor contrast, direct sunlight, fog, mist, rain and steam or smoke. Likewise, multiple modulated light sources may be used in the device 6 to ensure redundancy and dirt, coatings, grease etc. To avoid distraction the light source 38 may use an invisible wavelength such as UV or IR or some combination of wavelengths.

In an embodiment, the wearable device light source 38 or mountable device light source outputs modulated light. This can be provided in a similar manner as for the illuminating light source 9 described above. In an embodiment, the modulated light is modulated in intensity over time. The modulated light source 38 may flash at known intervals in order to identify the source. The modulated light source 38 has high contrast so that it may be detected by a camera 8 even in the presence of direct sunlight, fog or poor lighting conditions.

In addition to allowing the wearable device light source 38 or mountable device light source to be easily identified, the modulation of light from the wearable device light source 38 or mountable device light source may be used to transmit information about the wearable device 6 and/or the worker 2 carrying it, or mountable device and/or machinery on which it is mounted. Similarly, the light source 38 may modulate in time, color or wavelength to transmit information at relatively high bandwidths. The modulated light source 38 based on a LED or laser source may convey information about location, speed, acceleration and unique identifiers such as name, serial number and system log. In an embodiment, the modulated light encodes a unique identifier.

Where the light source 38 is modulated, the light detectors may be phase-locked to the light source 38. The flashing light 38 may be phase locked with an image detection device 8 such as a camera so that by locking the imaging detection to the frequency of the flashing light a far higher signal to noise ratio may be achieved.

In an embodiment, the processing system 12 is further configured to determine if the location of one or more of the workers 2 is within a defined area and output a warning signal in response thereto. Defined areas may include areas around hazardous machinery, or areas where a worker 2 is at higher risk due to, for example, exposure to environmental conditions. The warnings may comprise visual, audible, or tactile alerts. Warnings may be provided by a wearable device 6 to a respective worker 2 in embodiments which include a wearable device 6. Warnings may be provided to the worker 2 who enters the defined areas, or to other workers outside the defined area to alert them to a potentially dangerous situation.

In an embodiment, the processing system 12 is further configured to control the activity of machinery 3 based on the determined location of one or more of the workers 2. The location and velocity can be used, via an interface, to interlock or adjust the activity of machinery or robotic equipment to avoid accidents and collisions between personnel and machinery. This allows the system to automatically shut down or move machinery to reduce the chance of an accident without the necessity for human intervention.

The provision of warnings and control of machinery is carried out by a control unit 20. The control unit may be a part of the processing system 12, or may be a part of another system with which the processing system 12 interacts.

In an embodiment, the location system 25 further comprises wearable devices 6 to be worn by one or more of the workers 2 who are authorized, the wearable device including a wireless transceiver 32. Similarly, the location system 25 may comprise mountable devices 7 to be mounted on machinery 3 which is authorized, the mountable device 7 including a wireless transceiver 32. The mountable device 7 is substantially the same as the wearable device 6.

Figure 2:
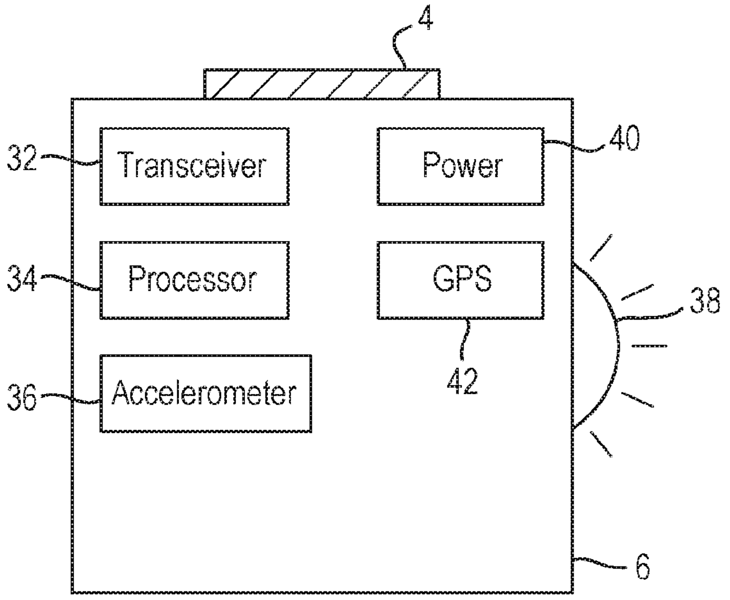
FIG. 2 is a schematic of a person-worn device and a glove incorporating the person-worn device.

FIG. 2 depicts a person-worn device 6 for locating a worker 2 that incorporates a power supply 40, a processor 34, a modulated light source 38 such as a LED or retroreflector and a wireless radio transceiver 32. The person-worn locating device 6 may be incorporated into an item of PPE such as a glove 11. The device 6 may further comprise an accelerometer 36, a GPS transceiver 42, and a reflective element 4. Some or all of these elements may be provided in wearable devices 6 according to the embodiments described herein. The wearable device may be incorporated into personal protective equipment.

Figure 3:
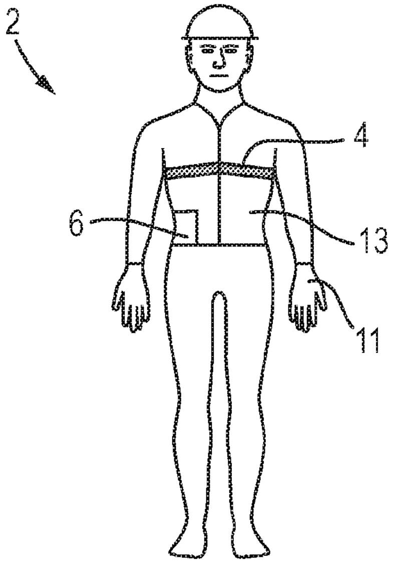
FIG. 3 is a schematic of a worker carrying a wearable device according to an embodiment.

FIG. 3 depicts a worker 2 wearing personal protective equipment (PPE) 11, 13 incorporating a person-worn device 6 that may accurately and precisely locate the position of the worker 2 by means of triangulation of emissions from a modulating light source, or retroreflected from retroflectors on the person worn device 6, and detected from multiple cameras 8 at known locations, or by means of triangulation of radio frequency emissions by multiple wireless receivers 10 at known locations.

Figure 4:
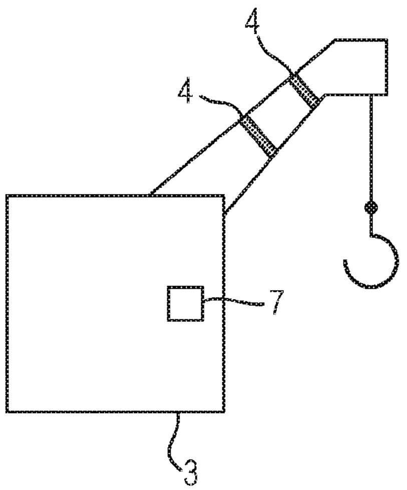
FIG. 4 is a schematic of an item of machinery mounted with a mountable device to be used according to an embodiment.

FIG. 4 shows a similar mountable device 7 mounted onto an item of machinery 3. In the embodiment of FIG. 4, the machinery 3 is also provided with reflective elements 4.

Figure 5:
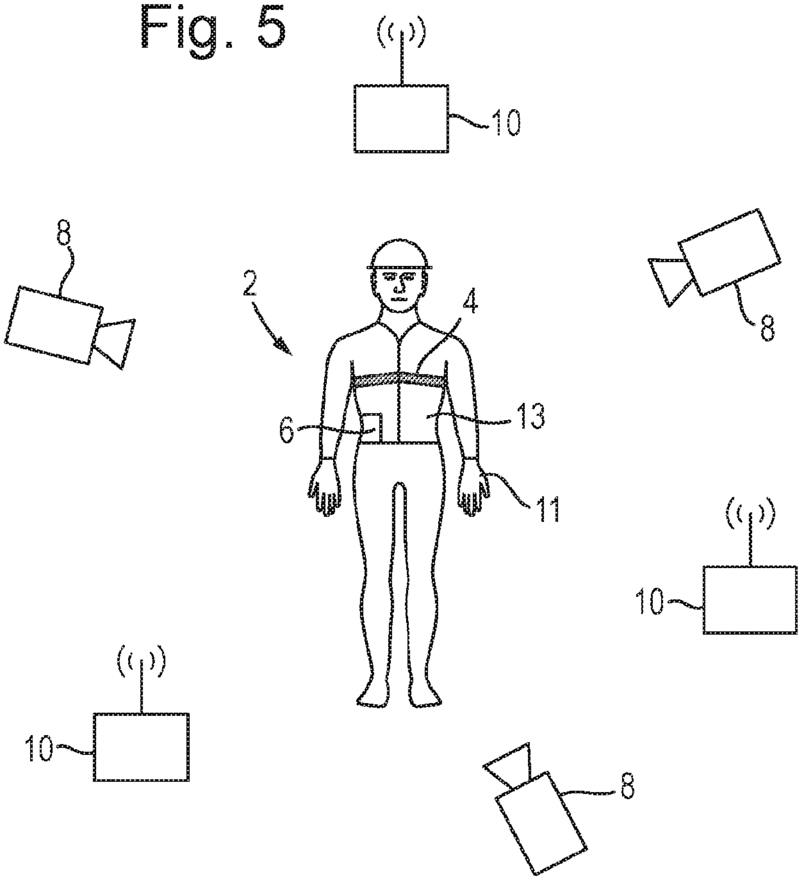
FIG. 5 is a schematic of a drill floor with a worker, a person-worn device and multiple cameras and wireless transceivers.

FIG. 5 shows an example of detection of the position of the worker 2 by light detectors 8 and wireless receivers 10 of the location system 25. As in FIG. 3, the worker 2 carries a wearable device 6, as well as reflective elements 4 incorporated into an item of PPE 13.

In an embodiment, the wireless signal transmissions from the wearable device 6 and/or mountable device 7 comprise radio-frequency signal transmissions. Long wave radio frequency transmissions may be exploited to locate the device of the invention to within 10 centimeters. The advantage of long wave RF signals is that they may not be affected by the presence of machinery, tubular and other steel objections around the rig that may attenuate or reflect the signal. These LW transmission transceivers may locate people and machinery onto which devices have been mounted. An example is the My Zone Global system for mounting within a hard-hat.

Alternative technologies for locating devices in cluttered environments include exploiting ultrawideband RF location (such as that manufactured by DecaWave, Dublin, Ireland) and Low power radar to detect or locate the presence of an object, machine or person in proximity. In an embodiment, the processing system is configured to determine the locations of the authorized workers 2 using ultrawideband radio-frequency location.

In an embodiment using wearable devices 6 incorporating wireless transceivers 32, the location system 25 further comprises a plurality of wireless receivers 10 mounted at known locations and configured to detect wireless signal transmissions from the wearable device 6. Similarly to the light detectors 8 used in optical location determination, the wireless receivers allow the location of the worker 2 to be determined using the signals from the wearable device 6.

Where the location system 25 comprises mountable devices 7 mounted on respective machinery 3, the plurality of wireless receivers 10 are configured to detect wireless signal transmissions from the mountable device 7.

Where the location system 25 comprises a plurality of wireless receivers 10, the receivers 10 are preferably mounted to maximize coverage and reception from a wide area such as a drill floor. The wireless receivers 10 are preferably mounted at height above the region of interest where the workers 2 and machinery 3 are located. Additionally, the wireless receivers 10 mounted at height may be inverted by 180 degrees to maximize coverage over the area in which workers 2 and machinery 3 are to be located, which may be a drill floor area.

Optionally, the wireless receivers 10 are mounted in a similar, inverted, manner to smoke alarms to ensure coverage of up to 360 degrees to receive maximum signal strength from mountable and wearable devices 6. Likewise, the light detectors 8 may be mounted inverted and at height to maximize light capture of light reflected from workers 2 or machinery 3, or light emitted by mountable or wearable devices 6.

The light detectors 8 may be 360-degree image capture devices, cameras or 360 camera orbs, and may be mounted inverted like smoke alarms at height above the area in which workers 2 and machinery 3 are to be located, such as a drill floor area. The receivers 10 and light detectors 8 are preferably mounted at a height of two meters or greater above the drill floor. The wireless receivers 10 or light detectors 8 may be securely mounted by means of magnetic sub-mounts to metallic surfaces, rigid structures, girders or beams.

In these embodiments, the processing system 12 is configured to determine locations of the authorized workers using the wireless signal transmissions from the wearable device 6 detected by the wireless receivers 10. Similarly, the processing system 12 is configured to determine locations of the authorized machinery using the wireless signal transmissions from the mountable device 7 detected by the wireless receivers. Such determination is carried out by the wireless processing unit 16.

In an embodiment, the processing system 12 is configured to determine the locations of the authorized workers using the wireless signal transmissions from the wearable device 6 by triangulation of the wireless signal transmissions. For example, the time of flight of the wireless signal transmissions may be used.

In one embodiment, the person worn location device may be combined with the synchronous camera detection of retroreflective surfaces. In such an embodiment, the processing system 12 is configured to determine locations of the authorized workers by combining the locations of the authorized workers determined using the light detected by the light detectors 8 and the locations of the authorized workers determined using the wireless signal transmissions from the wearable device 6. The combination may be such that one location determination is used as a backup or redundant system in case the other fails or becomes unavailable or unreliable. Alternatively, the combination may be used to improve accuracy of the determined location of workers and/or machinery by providing a single combined location. The combined processing is carried out by the combined processing unit 18.

Having two location determination mechanisms also provides a method to identify authorization of workers and machinery to be in a given area. The detected persons or machines may be compared using the computer with devices on personnel or machinery located by means of radio frequency triangulation using long wave or ultrawideband RF location.

In an embodiment, the processing system 12 is configured to identify as unauthorized workers any workers whose location is determined using the light detected by the light detectors 8 who are not authorized workers whose location is determined using the wireless signal transmissions from the wearable device 6. Similarly, the processing system 12 is further configured to identify as unauthorized machinery any machinery whose location is determined using the light detected by the light detectors 8 which is not authorized machinery whose location is determined using the wireless signal transmissions from the mountable device 7.

Authorized personnel and equipment will carry a retroreflector(s) as well as RF triangulation device for location and confirmation of identity, whereas all other persons and equipment will carry a retroreflector alone. This provides a way to distinguish and detect unauthorized workers or machinery.

In an embodiment, the processing system 12 is configured to use this information to determine whether an alarm should be sounded or machinery should be controlled. If the persons or machinery detected by synchronous imaging of retroflected light are among those person or machines that are detected by means of person or machine-borne devices using radio-frequency triangulation then no alarm is sounded and evasive action, or interlocking of machinery, may not be required. If, on the other hand, the persons or machines detected by synchronous imaging of retroflected light are not among those detected by means of RF triangulation of person or machine-borne devices, then an alarm may be sounded and evasive action may be required. In an embodiment, the processing system may be configured to output a warning signal if the location of one or more of the workers identified as unauthorized workers is within a defined area. The persons or machines so identified may be compared with the location of RF triangulated or wirelessly located devices worn by machines and personnel to determine who is present in a given area and who is authorized to be present in that area so as to trigger or cancel an alarm. In this manner, a system may be provided that alarms when unauthorized personnel or equipment enters into a hazardous zone or defined area.

In an embodiment, the processing system 12 is further configured to control the activity of machinery based on the location of the workers identified as unauthorized workers.

In an embodiment, the processing system 12 is further configured to compare the determined locations of workers to the determined locations of machinery. This can provide a more direct measure of whether a worker 2 is at risk due to proximity to machinery 3. In an embodiment, the processing system 12 is further configured to output a warning signal and/or control the activity of machinery 3 based on the comparison of the locations of workers 2 and the locations of machinery 3.

The design of the wearable device for use in embodiments of the location system is an example of a wearable device for locating a worker. This is a person-worn device 6 for tracking the location and velocity of a worker 2 in a hazardous environment by means of triangulation of a modulated optical signals (from a coherent or semi-coherent light source such as a at least one LED or laser) and multiple detectors 8 such as cameras or photodetectors even in very poor (e.g. Fog, steam, mist, rain, smoke) or very strong lighting conditions (e.g. direct sunlight) and incorporating a processor 34, a power supply 40 and sensors for monitoring worker speed, acceleration, aspect and health 36. The person-worn device 6 also incorporates radio frequency wireless communications 42 for geo-location of the device and communication of device speed, velocity, acceleration, angle, altitude, battery power and device health.

The device of the invention incorporates a power supply 40, such as a battery, and may also incorporate radio-frequency wireless communications 32, a light source 38 that may be modulated, such as a LED, and means for locating the device on the worker with a high degree of precision and accuracy by means of geolocation 42 coupled with a locating and correction mechanism such as triangulation by means of radio frequency wireless transmissions from a network of beaconing wireless gateways.

In particular, the wearable device 6 comprises a wireless transceiver, and a wearable device light source 38 and/or one or more reflective elements 4. The device of the invention combines radio frequency wireless communications with optical communications using a modulated light. The light may be a LED, or laser or other emitter of visible or near-visible wavelengths such as UV or Infrared.

In an embodiment with a wearable device light source 38, the wearable device light source 38 outputs modulated light. This has advantages as described above for similar types of modulated light source. In an embodiment, the wearable device light source 38 is modulated in intensity over time. However, in other embodiments, other types of modulation may be used. Examples include wavelength modulation, and modulation in space rather than time. In an embodiment, the modulated light encodes a unique identifier.

The primary feature of the light is to warn colleagues of the presence of an unauthorized worker in a restricted zone, to alert workers to hazards and to interact with detector mechanisms such as cameras or photodetectors acting as a redundant communications method to complement radio frequency communications from and to the device.

In an embodiment with reflective elements 4, light reflected from the reflective element is modulated light. This can be achieved as described above using selective wavelength reflection, filters or other means.

In an embodiment, the modulated light is spatially modulated in intensity. This could be achieved by using barcodes, QR codes, or similar markers, which provide spatial modulation of reflected intensity. In an embodiment, the modulated light encodes a unique identifier.

In an embodiment, the wearable device further comprises a power supply and/or an accelerometer. The device of the invention incorporates a processor and sensors for monitoring motion such as 3-axis accelerometers, inclinometers, proximity sensors, electro-magnetic sensors, gyroscopes, RF ID ultrawideband RF location, low-power radar and altimeters. Temperature, pressure and heart rate may also be monitored for logging of health or sensor condition. The information from these other sensors may be combined with optical and wireless location determination to improve accuracy, or to provide further redundancy. They may also be used to alert workers if the device is not functioning properly, or to alert supervisors if the measurements suggest the worker may be injured or at risk.

In an embodiment, the wearable device further comprises an accelerometer and/or a gyroscope. These allow detection of movement of the workers 2 and/or machinery 3, as well as detection of orientation of the sensors.

The device of the invention may be worn or incorporated into suitable clothing such as a vest, coat, personal protective equipment, footwear, gloves, head-gear, collars, epaulettes, buttons, belts or shoelaces.

The system and device disclosed herein are suitable to for use in implementing a method for locating workers comprising detecting light from one or more workers 2 using a plurality of light detectors 8 mounted at known locations, and determining locations of the workers 2 using the light detected by the light detectors 8.

Embodiments of this method may include features corresponding to those of the system features described above. For example, the method may further comprise detecting wireless signal transmission from one or more wearable devices 6 worn by respective workers 2 using a plurality of wireless receivers 10 mounted at known locations, and determining locations of the workers 2 using the wireless signals detected by the wireless receivers 10.

Figure 6:
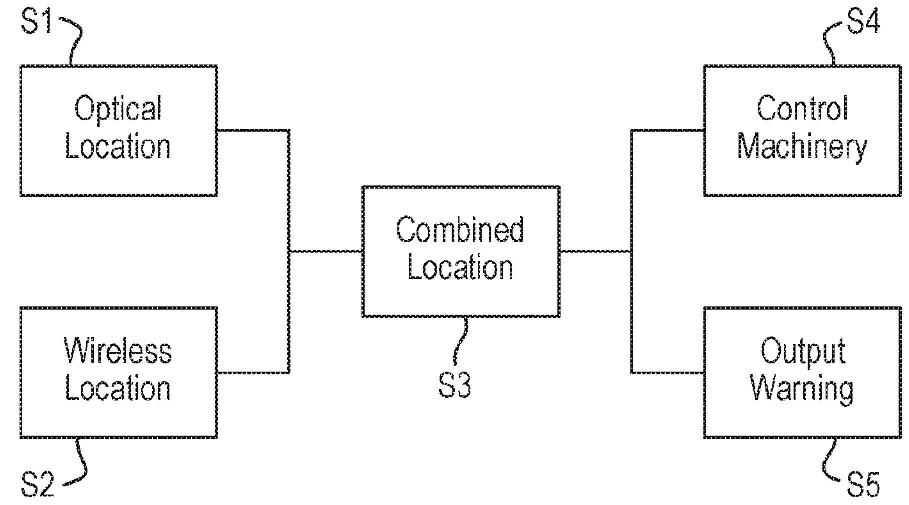
FIG. 6 is a flow diagram of a method for locating workers and/or machines.

An example flowchart for such a method is shown in FIG. 6. In step S1, the location of a worker 2 or machine 3 is determined using light detected by light detectors 8. In step S2, the location of the worker 2 or machine 3 is determined using wireless signal transmissions detected by wireless receivers 10. In step S3, the locations determined by optical and wireless means are combined. In steps S4 and S5, the combined location determination is used to issue a warning or control machinery. As described above, this may be if a worker 2 enters a defined area, or if an unauthorized worker is detected by a difference between optical and wireless location determination.

Figure 7:
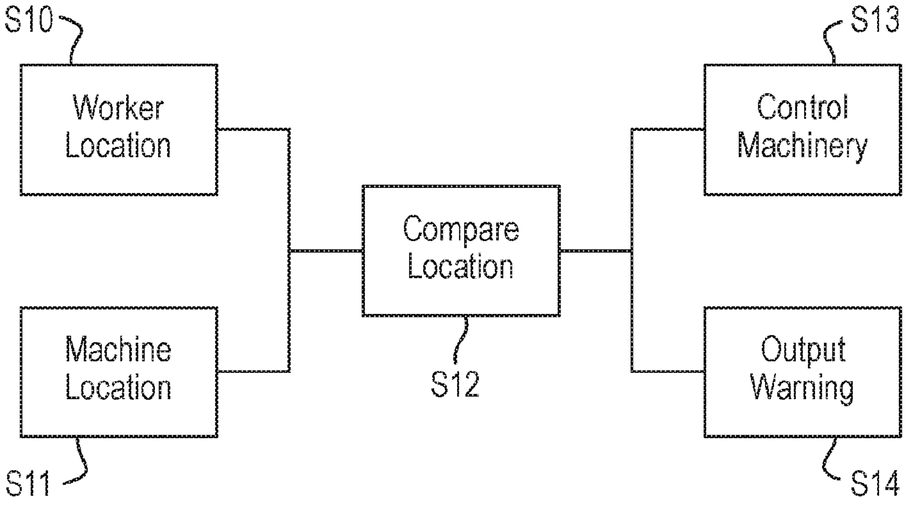
FIG. 7 is a flow diagram of a method for comparing locations of workers and machines.

An example flowchart for a further embodiment of the method is shown in FIG. 7. In this method, the locations of workers 2 and machines 3 determined in steps S10 and S11 using the method are compared in step S12. The result of the comparison is used to control machinery in step S13 or issue alarms in step S14. For example, an alarm may be given, or machinery shut off if a worker moves too close to a machine.

The following numbered clauses represent additional aspects of the disclosure. The features disclosed in these clauses may be used in combination with those described above.

1. A wireless device for locating a worker, the device incorporating a processor, a power supply, an accelerometer and wireless communications and a modulated light source.

2. The device of clause 1 whereby its location and position may be determined by means of triangulation using multiple light detectors such as photodetectors or cameras mounted at known positions and detecting the modulated light emissions from the device from multiple angles.

3. A wireless device for locating a worker, the device incorporating a processor, a power supply, an accelerometer and wireless radio communications and at least one retroreflector, reflecting light from a modulated light source and detected by a camera.

4. A wireless device of clause 3 with at least one retroreflector, reflecting light from a light source and detected by a camera, whereby the retroreflector or light may be modulated or encoded to identify an object or worker.

5. The device of clause 1 whereby its position may be determined by means of triangulation of radio frequency using multiple wireless receivers mounted at known positions and detecting the transmissions from the device.

6. A device for tracking the location of a worker in a hazardous environment by means of triangulation of a modulated optical signal from multiple detectors and incorporating a processor, a power supply and sensors for monitoring worker acceleration.

7. The device of clause 1 whereby the power supply is replenished using energy scavenging from motion or vibration or air pressure.

8. The device of clause 1 whereby the power supply may be recharged or inductively charged.

9. A method for detecting objects in a defined zone or area comprising, a. Mounting a retroreflector onto a first set of objects,
b. Incorporating a radio-triangulation device on a first set of objects,
c. Mounting a retroreflector onto on a second set of objects,
d. Illuminating the objects with modulated light emitted from, or near, an imaging device or camera,
e. Detecting objects reflecting modulating light by the object-mounted retroreflectors,
f. Locating objects incorporating radio-triangulation devices,
g. Comparing the location of the first and second set of objects,
h. Determining which objects are inside a defined zone or area.

The invention claimed is:

1. A system configured to locate workers, the system comprising:

a first location system configured to determine locations of the workers in a working environment, the working environment being at least one of a drill floor, a deck, an oil rig, a drilling rig or a rig for extracting hydrocarbons;

worker devices to be carried by one or more of the workers who are authorized, each worker device including a wireless transceiver; and a second location system arranged to determine the locations of the worker devices as the locations of authorized workers; and a processing system configured to determine first locations of the workers using the first location system and to determine second locations of the authorized workers using the second location system;

wherein:

the processing system is further configured to identify as unauthorized workers any workers whose location is determined using the first location system who are not authorized workers whose location is determined using the wireless signal transmissions from the worker devices;

the processing system is further configured to determine if the location of each worker is within a defined area; and in response to each determination that a worker is within the defined area, determine to output a warning signal only if the worker is identified as unauthorized for the defined area such that a warning signal is not output if the worker is identified as authorized for the defined area.

2. The system according to claim 1, wherein the worker devices each comprise a GPS transceiver.

3. The system according to claim 1, wherein the processing system is configured to determine locations of the authorized workers by combining the locations of the authorized workers determined using the first location system and the locations of the authorized workers determined using the second location system.

4. The system according to claim 1, wherein the processing system is configured to control the activity of machinery based on the location of the workers identified as unauthorized workers.

5. The system according to claim 1, further comprising mountable devices to be mounted on machinery, wherein the second location system is configured to determine locations of the mountable devices as the locations of the machinery.

6. The system according to claim 5, wherein the processing system is further configured to:

compare the determined locations of workers to the determined locations of machinery; and output a warning signal and/or control the activity of machinery based on the comparison of the locations of workers and the locations of machinery.

7. The system according to claim 1, wherein the first location system comprises a plurality of light detectors mounted at known locations and configured to detect light from the workers, and the processing system configured to determine locations of the workers using the light detected by the light detectors.

8. The system according to claim 7, wherein the light from the workers is light reflected from the workers.

9. The system according to claim 8, wherein the system further comprises illuminating light sources adjacent to respective light detectors, the light reflected from the workers being light from the illuminating light sources.

10. The system according to claim 8, wherein the system further comprises at least one reflective element to be mounted on respective workers, the light reflected from the workers being light reflected from the reflective element.

11. The system according to claim 10, wherein the light reflected from the reflective element is modulated light.

12. The system according to claim 11, wherein the modulated light is spatially modulated in intensity, and/or modulated in wavelength.

13. The system according to claim 11, wherein the modulated light encodes a unique identifier.

14. The system according to claim 10, wherein the reflective element is a retroreflector.

15. The system according to claim 7, wherein the first location system is further configured to determine locations of machinery using light from the machinery detected by the light detectors.

16. The system according to claim 1, wherein the second location system comprises a plurality of wireless receivers mounted at known locations and configured to detect wireless signal transmissions from the worker device, and the processing system is configured to determine locations of the authorized workers using the wireless signal transmissions from the worker device detected by the wireless receivers.

17. The system according to claim 16, wherein the wireless signal transmissions comprise radio-frequency signal transmissions.

* * * * *